United States Patent Office 2,750,399
Patented June 12, 1956

2,750,399

PROCESS FOR ALKYL PHOSPHORYL DICHLORIDES

Harry R. Gamrath, St. Louis, Mo., assignor to Monsanto Chemical Company, St. Louis, Mo., a corporation of Delaware No Drawing. Application December 27, 1949,
Serial No. 135,311

9 Claims. (Cl. 260—461)

This invention relates to alkyl phosphoryl dichlorides and their method of preparation; more specifically, this invention relates to certain alkyl phosphoryl dichlorides having the formula

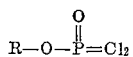

wherein R represents an alkyl radical terminating with a $CH_2$ group and containing at least 6 and not more than 18 carbon atoms.

The alkyl phosphoryl dichlorides of this invention are valuable intermediates in the syntheses of various compounds, useful as insecticides, hydraulic fluids, synthetic lubricants, plasticizers, etc. Neutral ortho-phosphate esters, for example, are obtained by reacting the alkyl phosphoryl dichlorides of this invention with a slight excess of an alkali metal arylate in an aqueous solution. When the alkyl phosphoryl dichlorides of this invention are reacted with water, alkyl phosphoric acids are produced, the latter being particularly useful in textile and paper processing compounds, as catalysts in urea-aldehyde resin formation and as polymerizing agents in the preparation of resins and polymerization of oils. When the alkyl phosphoryl dichlorides of this invention are reacted with ammonia or amines, compounds useful as oil additives are produced.

The alkyl phosphoryl dichlorides of this invention are mobile liquids with a pungent odor. They are generally essentially colorless, although the color may vary from pale yellow to violet-brown, depending upon the purity of the alcohol used for their preparation. They are insoluble in water, but hydrolyze fairly readily in the presence of moisture to form alkyl phosphoric acids.

Unlike the aryl phosphoryl dichlorides, the alkyl phosphoryl dichlorides of this invention are relatively unstable. At 25–30° C. they decompose slowly with the liberation of hydrogen chloride with complete decomposition at such a temperature requiring days or weeks. However, at 100°–150° C., the decomposition is very rapid, requiring only a few minutes' exposure to such an elevated temperature. The decomposition reaction is exothermic. The normal alkyl phosphoryl dichlorides are more stable than the branched chain alkyl phosphoryl dichlorides.

The alkyl phosphoryl dichlorides of this invention also differ in physical characteristics from the lower alkyl phosphoryl dichlorides, such as those wherein the alkyl chain contains from 1 to 4 or 5 carbon atoms. These lower alkyl phosphoryl dichlorides are more stable and may be purified by distillation, whereas the alkyl phosphoryl dichlorides of this invention, due to their instability, can not be purified by distillation even under reduced pressures, e. g., as low as 0.8 mm. Hg absolute. Typical relationships that exist between the boiling point and the decomposition temperature range of various alkyl phosphoryl dichlorides are shown in the following table wherein:

Column A is the time required for the exothermic decomposition to start when the alkyl phosphoryl dichloride is maintained at 100°–110° C.

Column B is the boiling range when the mass temperature is maintained at 70°–80° C., which is a reasonably safe mass temperature in view of the exothermic decomposition characteristics.

| Compound | A | B |
|---|---|---|
| Methyl phosphoryl dichloride. | None in 24 hours.. | 62–68° C./30 mm. Hg absolute. |
| Butyl phosphoryl dichloride. | 1.25–1.5 hours | 66–72° C./2.5–3 mm. Hg absolute. |
| Isoamyl phosphoryl dichloride. | 45 minutes | 68–73° C./0.5–0.8 mm. Hg absolute. |
| n-Hexyl phosphoryl dichloride. | 40–50 min | Does not distill with mass temp. at 70–80° C. under 0.8 mm. Hg absolute. |
| 6-Methylheptyl phosphoryl dicholride. | 35–40 min | Do. |
| 2-Ethylhexyl phosphoryl dichloride. | 7–9 min | Do. |
| n-Octyl phosphoryl dichloride. | | Do. |
| Decyl phosphoryl dichloride. | 40–45 min | Do. |
| n-Dodecyl phosphoryl dichloride. | | Do. |
| Tridecyl phosphoryl dichloride. | 80 min | Do. |
| Tetradecyl phosphoryl dichloride. | 60 min | Do. |
| Octadecyl phosphoryl dichloride. | | Do. |

The novel compounds of this invention are prepared by reacting under controlled conditions a 1 molecular proportion of a $C_6$ to $C_{18}$ primary alkyl alcohol with a 1 molecular proportion of phosphorus oxychloride, while continuously removing the HCl formed under reduced pressure. The alkyl phosphoryl dichlorides are thereby formed in essentially quantitative yields and require no further purification. The following examples are illustrative of the manner in which the novel compounds of this invention may be prepared:

EXAMPLE I n-Hexyl phosphoryl dichloride 153.4 g. of $POCl_3$ were cooled with stirring to about 5° C. in a glass lined closed reaction vessel. 102.1 g. of n-hexyl alcohol were cooled to about 10° C. and added to the $POCl_3$ with continuous stirring and at a rate so as to maintain a reaction temperature of about 10° C. The reaction mixture was continuously agitated over a period of about 1 hour. The mixture was then stirred for an additional hour under vacuum (below 30 mm. Hg absolute) to remove the hydrogen chloride gas was which is evolved.

After removal of the hydrogen chloride gas, the vacuum was released and the product was weighed. The quantity of the n-hexyl phosphoryl dichloride obtained was 219.3 g. or an essentially quantitative yield on the phosphorus oxychloride and n-hexanol.

| Analysis | | Cl |
|---|---|---|
| Calculated for: $C_6H_{13}OPOCl_2$ | percent.. | 32.4 |
| Found | do.... | 32.1 |
| Specific gravity at 25°/25° C | | 1.1780 |

EXAMPLE II

2-ethylbutyl phosphoryl dichloride 2-ethylbutyl phosphoryl dichloride was prepared by adding 51.1 g. of 2-ethylbutanol to 76.7 g. of phosphorus oxychloride, cooled to 10° C., with continuous stirring and cooling and at such a rate as to maintain a reaction temperature of 10 to 15° C. The reaction mixture was held at 15° C. for an hour following the addition of the 2-ethylbutanol and thereafter the reaction temperature was raised to 25° C. and the reaction thereafter continuously stirred and held under a vacuum (30 mm. Hg absolute) to remove the HCl evolved for an additional hour to complete the formation of the 2-ethylbutyl phosphoryl dichloride.

The 2-ethylbutyl phosphoryl dichloride produced weighed 109.5 g. This represents a quantitative yield on phosphorus oxychloride and alcohol.

| Analysis | Cl |
|---|---|
| Calculated for: $C_6H_{13}OPOCl_2$ percent | 32.4 |
| Found do | 32.4 |
| Specific Gravity at 25°/25° C | 1.1868 |

EXAMPLE III

2-methylpentyl phosphoryl dichloride 2-methylpentyl phosphoryl dichloride was prepared by adding 102.1 g. of 2-methylpentanol, cooled to 10° C., to 153.4 g. of phosphorus oxychloride cooled to 10° C. with stirring and cooling and at a rate so as to maintain a reaction temperature of 10 to 15° C. After all of the 2-methylpentanol had been added to the phosphorus oxychloride the reaction was carried to completion to form 2-methylpentyl phosphoryl dichloride in the same manner as was described for the preparation of 2-ethylbutyl phosphoryl dichloride.

The 2-methylpentyl phosphoryl dichloride weighed 120.8 g. This is equivalent to the theoretical yield.

EXAMPLE IV n-Octyl phosphoryl dichloride

This acid chloride was prepared by reacting 195.2 g. of n-octyl alcohol with 230.1 g. of $POCl_3$, in the manner as described for the preparation of 2-ethylhexyl phosphoryl dichloride, to form n-octyl phosphoryl dichloride. From this reaction there were obtained 369.1 g. of dichloride, representing a yield of 99.7% on $POCl_3$ and n-octyl alcohol. The specific gravity of the product at 25°/25° C. was 1.1248.

EXAMPLE V

2-ethylhexyl phosphoryl dichloride 44.3 g. of $POCl_3$ were cooled with stirring to about 10° C. in a glass lined closed reaction vessel. 37.6 g. of 2-ethylhexanol were cooled to approximately 15° C. and added to the $POCl_3$ with continuous stirring and at a rate so as to maintain a reaction temperature of about 15° C. The reaction mixture was agitated and the reaction temperature of 15° C. was maintained for one hour following the addition of all the 2-ethylhexanol; thereafter, the temperature was allowed to rise to approximately 25° C. and the stirring was continued for another hour. The hydrogen chloride gas which was evolved from the reaction was continuously removed by means of applying a vacuum to the reaction vessel.

After the reaction between the 2-ethylhexanol and the $POCl_3$ and the removal of the hydrogen chloride had been completed, the reaction mass was weighed. The product weighed 71.2 g., which corresponds to a quantitative yield of 2-ethylhexyl phosphoryl dichloride based on the $POCl_3$ and 2-ethylhexanol used.

| Analysis | Cl |
|---|---|
| Calculated for $C_8H_{17}OPOCl_2$ percent | 28.7 |
| Found do | 28.8 |
| Specific Gravity at 25°/25° C | 1.1320 |

EXAMPLE VI

6-methylheptyl phosphoryl dichloride 153.4 g. of $POCl_3$ were cooled with stirring to about 10° C. in a glass lined closed reaction vessel. 130.2 g. of isooctyl alcohol (6-methyl-1-heptanol) were cooled to about 10° C. and added to the $POCl_3$ with continuous stirring and at a rate so as to maintain a reaction temperature of 10–14° C. The reaction mixture was continuously agitated and the temperature was gradually increased to 25° C. over a period of about one hour. While the stirring was continued, the reaction mixture was placed under a vacuum (below 50 mm. Hg absolute) for another 1½ hours to remove the hydrogen chloride gas which is evolved from the reaction. The reaction mixture now contains predominantly 6-methylheptyl phosphoryl dichloride. The yield based on 6-methylheptyl alcohol and on $POCl_3$ was essentially quantitative.

| Analysis | Cl |
|---|---|
| Calculated for: $C_8H_{17}OPOCl_2$ percent | 28.7 |
| Found do | 28.7 |
| Specific Gravity at 25°/25° C | 1.1329 |

EXAMPLE VII

Nonyl phosphoryl dichloride

In a glass lined closed reaction vessel, 191.8 g. of $POCl_3$ were cooled to a temperature of 5 to 10° C. 180.3 g. of nonyl alcohol (3,5,5-trimethyl-1-hexanol) were cooled to 5 to 10° C. and added to the $POCl_3$ with continuous stirring and at a rate so as to maintain a reaction-mass temperature of about 15° C. The reaction mixture was agitated and the temperature of the reaction mixture was allowed to come up to room temperature. Thereafter the stirring was continued and the reaction mixture was placed under vacuum (below 50 mm. Hg absolute) over a period of 2 hours, thereby removing the hydrogen chloride gas which is evolved from the reaction.

From the charges of reactants listed, 325.7 g. of nonyl phosphoryl dichloride were obtained, this quantity being a quantitative yield on the nonyl alcohol and $POCl_3$.

| Analysis | Cl |
|---|---|
| Calculated for: $C_9H_{19}OPOCl_2$ percent | 27.2 |
| Found do | 27.1 |
| Specific Gravity at 25°/25° C | 1.1067 |

EXAMPLE VIII n-Decyl phosphoryl dichloride 158.1 g. of n-decyl alcohol were cooled to about 20° C. and added to 153.4 g. of $POCl_3$ cooled to approximately 20° C. in a glass lined closed reaction vessel with continuous stirring and cooling so as to maintain a reaction temperature of about 20° C. After all of the n-decyl alcohol had been added, while continuously agitating the mixture for an additional hour, the temperature was slowly raised to about 50° C. and a vacuum applied to the system to remove the hydrogen chloride gas evolved from the reaction.

After the removal of the hydrogen chloride gas, the reaction mass weighed 274.5 g., which is a yield of 99.8% on $POCl_3$ and n-decyl alcohol.

EXAMPLE IX

Decyl phosphoryl dichloride

The decyl alcohol used in this example was a branched chain decyl alcohol manufactured from the polymerization product of olefins. While at the time of this application, the exact structure of the branched chain has not been definitely established, the fact that the alcohol does have a 10 carbon atom branched chain primary alcohol structure has been definitely established. These alcohols, generally, are manufactured by polymerizing short chain olefins to form a long chain polymeric olefinic hydrocarbon, reacting this polymer with formaldehyde and hydrogenating the polymer-formaldehyde reaction product to form the alcohol.

76.7 g. of POCl₃ were cooled with stirring to about 15° C. in a glass lined closed reaction vessel. 79.2 g. of the above described decyl alcohol were cooled and added to the POCl₃ at a rate so as to maintain a reaction temperature of about 15° C. The reaction mixture was continuously agitated and the reaction temperature was allowed to rise to room temperature. Thereafter the stirring was continued and the reaction was carried to completion to form the decyl phosphoryl dichloride by placing the reaction mixture under a vacuum (below 50 mm. Hg absolute) over a period of 2 hours, thereby removing the hydrogen chloride gas which is evolved from the reaction.

The amount of decyl phosphoryl dichloride obtained from this reaction was 134.2 g. or representing a yield of 97.5% on decyl alcohol and POCl₃. The specific gravity was 1.0924 at 25°/25° C.

EXAMPLE X n-Dodecyl phosphoryl dichloride n-Dodecyl phosphoryl dichloride was prepared in the manner described for the preparation of n-decyl phosphoryl dichloride by reacting 186.3 g. of n-dodecyl alcohol (at 25° C.) with 153.4 g. POCl₃, maintaining a reaction temperature of about 25° C. The n-dodecyl phosphoryl dichloride thus obtained weighed 301.5 g., this weight being a yield of 99.4% on the n-dodecyl alcohol and POCl₃.

| Analysis | Cl |
| --- | --- |
| Calculated for: $C_{12}H_{25}OPOCl_2$ percent | 23.4 |
| Found do | 23.2 |
| Specific Gravity at 25°/25° C | 1.0594 |

EXAMPLE XI

Tridecyl phosphoryl dichloride 120.1 g. of a 13 carbon branched chain primary alcohol prepared from the polymerization products of olefins were cooled to about 20° C. and added to 92.0 g. of POCl₃ cooled to about 20° C. in a glass lined closed reaction vessel with continuous stirring and cooling so as to maintain a reaction temperature of about 20° C. The reaction mixture was agitated and the temperature slowly raised to 30° to 40° C. and maintained at that temperature for one hour following the addition of all the tridecyl alcohol. The temperature was then raised to about 50° C. and the stirring continued for another hour. The hydrogen chloride gas which was evolved from the reaction was continuously removed by means of applying a vacuum to the reaction vessel.

From the above-described reaction 189.2 g. of tridecyl phosphoryl dichloride were obtained. This weight is essentially a quantitative yield on tridecyl alcohol and POCl₃. The specific gravity of the compound at 25°/25° C. was 1.0613.

EXAMPLE XII

Tetradecyl phosphoryl dichloride 76.7 g. of POCl₃ were cooled with stirring to a temperature of 5° to 10° C. in a glass lined closed reaction vessel. 107.1 g. of a 14 carbon branched chain primary alcohol prepared from the polymerization products of olefins were cooled to 5° to 10° C. and added to the POCl₃ with continuous stirring at a rate so as to maintain a reaction mass temperature of about 15° C. The reaction mixture was agitated and the temperature of the reaction mixture allowed to come up to room temperature. Thereafter the stirring was continued and the reaction mixture placed under a vacuum (below 50 mm. Hg absolute) over a period of 2 hours thereby removing the hydrogen chloride gas which was evolved during the reaction.

After the removal of the hydrogen chloride gas was completed, the tetradecyl phosphoryl dichloride weighed 164.4 g. This is a yield of 99.3% on tetradecyl alcohol and POCl₃. The specific gravity of the compound was 1.0556 at 25°/25° C.

EXAMPLE XIII n-Hexadecyl phosphoryl dichloride 153.4 g. of POCl₃ were cooled with stirring to about 15° C. in a glass lined closed reaction vessel. 242.4 g. of n-hexadecyl alcohol were heated to about 50° to 60° C. and added to the POCl₃ with continuous stirring over a period of about 1½ hours and at such a rate so as to maintain a reaction temperature of from 10° to 15° C. The reaction mass was then slowly heated to 26° C. and stirred for an additional hour while removing under vacuum the hydrogen chloride gas which is evolved. The reaction mixture now contains predominantly n-hexadecyl phosphoryl dichloride.

From the reactants charged, 357.5 g. of dichloride were obtained. This is a yield of 99.6% on n-hexadecyl alcohol and POCl₃.

EXAMPLE XIV n-Octadecyl phosphoryl dichloride 153.4 g. of POCl₃ were cooled with stirring to about 10° C. in a glass lined closed reaction vessel. 270 g. of powdered n-octadecyl alcohol were added to the POCl₃ with continuous stirring and at a rate so as to maintain a reaction temperature of about 25° C. The reaction mixture was continuously agitated over a period of about 1 hour. While the stirring was continued, the temperature was slowly raised to about 40° C. and the reaction mixture was placed under a vacuum (below 50 mm. Hg absolute) for another 1½ hours to remove the hydrogen chloride gas which is evolved from the reaction. The reaction mixture contained predominantly n-octadecyl phosphoryl dichloride.

The charge listed produced 383.4 g. of n-octadecyl phosphoryl dichloride. This is a yield of 99.1% on the alcohol and phosphorus oxychloride. n-Octadecyl phosphoryl dichloride crystallizes at about 30° C.

| Analysis | Cl |
| --- | --- |
| Calculated for: $C_{18}H_{37}OPOCl_2$ percent | 18.3 |
| Found do | 18.2 |
| Specific Gravity at 31°/25° C | 0.9995 |

EXAMPLE XV

Octadecyl phosphoryl dichloride

The octadecyl alcohol used in this example was 2-(1,3,3-trimethylbutyl)5,7,7-trimethyl-1-octanol prepared from the polymerization products of olefins.

76.7 g. of POCl₃ were cooled with stirring to about 25° C. in a glass lined closed reaction vessel. 135.5 g. of the above described octadecyl alcohol were cooled and added to the POCl₃ at a rate so as to maintain a reaction temperature of about 25° C. The reaction mixture was continuously agitated and the temperature allowed to rise to room temperature and maintained at this temperature for an additional one hour stirring period during which time the hydrogen chloride gas evolved during the reaction was removed by means of applying a vacuum (below 30 mm. Hg absolute) to the reaction vessel. The octadecyl phosphoryl dichloride obtained from the reaction weighed 191.7 g.; this represents a yield of 98.8% on the octadecyl alcohol and POCl₃.

While specific quantities, temperatures and reaction conditions have been set forth in the preceding examples, the process utilized in preparing the novel compounds of this invention is subject to considerable variation. Thus, while in a preferred embodiment of this invention a substantially 1 molecular proportion of the aliphatic alcohol is used for each 1 molecular proportion of phosphorus oxychloride, the quantities of reactants may be varied to an extent which depends on results desired. However, as the molecular proportion of the alcohol is increased beyond the preferred 1 molecular proportion, the formation of dialkyl phosphoryl chloride is promoted, affecting the yield and quality of the final product. If the molecular proportion of the alcohol is reduced below the preferred 1 molecular proportion, the yield and purity of the finished product is affected due to the presence of unreacted phosphorus oxychloride.

The reaction between the alcohol and phosphorus oxychloride is exothermic and is accompanied by a considerable evolution of hydrogen chloride. The rate of addition of the alcohol and the temperature at which the reaction mass is maintained is, therefore, governed by the nature of the equipment, cooling capacity and ability to remove hydrogen chloride as it is formed to prevent too violent a reaction. While it is preferred that the addition rate be so governed that the temperature may be maintained at substantially 15° C., it is evident that such a rate of addition and temperature will depend to a large extent on the nature of the equipment used and ability to control temperature to prevent loss of the reactants through volatilization.

The practical temperature range limits of this reaction are governed by the freezing point of POCl₃ and the color of the finished product desired. Since POCl₃ crystallizes at approximately 2° C., initial reaction temperatures below 2° C. are not practical. Once the reaction is begun, the temperature may then be reduced below 2° C. as the added alcohol and the alkyl phosphoryl dichloride formed depress the crystallizing point of the mass so that lower temperatures may be maintained. As the temperature of the reaction is increased beyond 25° C., the color of the alkyl phosphoryl dichloride is increased. Thus, the preferred and practical temperature range of this reaction is from about 2° C. to about 25° C. After the reaction is substantially complete, the temperature may be increased to a maximum of about 50° C. to facilitate the removal of the hydrogen chloride gas evolved in the reaction. The hydrogen chloride gas may be removed by any convenient manner well known to those skilled in the art, such as, by blowing the reaction mixture with air or by maintaining the reaction mixture under a reduced pressure, the latter procedure being preferred.

It is also preferred that the alcohol be added to the POCl₃. While the reverse order of addition of reactants may be utilized, such a reverse order promotes the formation of dialkyl phosphoryl chloride and a trialkyl phosphate ester, thereby affecting the purity of the final product.

This application is a continuation-in-part of copending application Serial No. 75,098, filed February 7, 1949, now U. S. Patent 2,504,121, which is a continuation-in-part of application Serial No. 38,194, filed July 12, 1948, now abandoned, which is a continuation-in-part of application Serial No. 720,310, filed January 4, 1947, now abandoned.

What is claimed is:

1. A process for the preparation of alkyl phosphoryl dichlorides having the formula

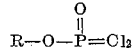

wherein R represents an alkyl radical terminating with a CH₂ group and containing at least 6 and not more than 18 carbon atoms, consisting of effecting an essentially quantitative yield of alkyl phosphoryl dichloride by the addition of a 1 molecular proportion of a primary alkyl alcohol containing at least 6 and not more than 18 carbon atoms to a substantially 1 molecular proportion of phosphorus oxychloride while maintaining a reaction temperature between about +2° C. and about + 25° C., after the addition of the said alcohol to the phosphorus oxychloride is complete, continuing to maintain a reaction temperature between about +2° C. and about +25° C. while removing under reduced pressure the hydrogen chloride formed until the reaction between the selected alkyl alcohol and the phosphorus oxychloride is substantially complete, and thereafter substantially completing the removal of the hydrogen chloride formed under a reduced pressure and at a temperature not exceeding 50° C.

2. The process as described in claim 1 wherein the primary alkyl alcohol is a primary alkyl alcohol containing 8 carbon atoms.

3. The process as described in claim 1 wherein the primary alkyl alcohol is 2-ethylhexanol.

4. The process as described in claim 1 wherein the primary alcohol is n-octyl alcohol.

5. The process as described in claim 1 wherein the primary alkyl alcohol is 6-methylheptanol.

6. The process as described in claim 1 wherein the primary alkyl alcohol is a primary alkyl alcohol containing 6 carbon atoms.

7. The process as described in claim 1 wherein the primary alkyl alcohol is n-hexanol.

8. The process as described in claim 1 wherein the primary alkyl alcohol is a primary alkyl alcohol containing 12 carbon atoms.

9. The process as described in claim 1 wherein the primary alkyl alcohol is n-dodecanol.

References Cited in the file of this patent

UNITED STATES PATENTS

| | | |
|---|---|---|
| 1,869,768 | Nicolai | Aug. 2, 1932 |
| 1,945,183 | Clemmensen | Jan. 30, 1934 |
| 2,005,619 | Graves | June 18, 1935 |
| 2,504,121 | Gamrath | Apr. 18, 1950 |

OTHER REFERENCES

Gerard: J. Chem. Soc. (London) (1940), pp. 1464–1469.

Gerard: J. Chem. Soc. (London), 1945, pp. 106–112.